(12) United States Patent
Sata et al.

(10) Patent No.: US 10,338,922 B2
(45) Date of Patent: Jul. 2, 2019

(54) SOFT SENSOR DEVICE FOR ACQUIRING A STATE VARIABLE BY CALCULATION USING A PLURALITY OF PROCESSOR CORES

(71) Applicant: TOYOTA JIDOSHA KABUSHIKI KAISHA, Toyota-shi, Aichi-ken (JP)

(72) Inventors: Kota Sata, Susono (JP); Akira Ohata, Uji (JP); Shunichi Azuma, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 42 days.

(21) Appl. No.: 15/594,854

(22) Filed: May 15, 2017

(65) Prior Publication Data
US 2017/0337057 A1  Nov. 23, 2017

(30) Foreign Application Priority Data

May 17, 2016 (JP) .................................. 2016-098930

(51) Int. Cl.
| G01D 1/16 | (2006.01) |
| G06F 9/30 | (2018.01) |
| G06F 9/38 | (2018.01) |
| G06F 9/46 | (2006.01) |
| G05B 15/02 | (2006.01) |
| G05B 17/02 | (2006.01) |
| G06F 11/10 | (2006.01) |
| G06F 12/0811 | (2016.01) |

(52) U.S. Cl.
CPC ........... *G06F 9/3004* (2013.01); *G05B 15/02* (2013.01); *G05B 17/02* (2013.01); *G06F 9/3891* (2013.01); *G06F 9/46* (2013.01); *G06F 11/108* (2013.01); *G06F 12/0811* (2013.01); *G01D 1/16* (2013.01)

(58) Field of Classification Search
None
See application file for complete search history.

(56) References Cited

U.S. PATENT DOCUMENTS

| 6,389,364 B1 * | 5/2002 | Vyers | G01F 1/6847 137/486 |
| 2007/0255483 A1 | 11/2007 | Tanaka | |
| 2017/0211411 A1 * | 7/2017 | Shepard | F01D 11/14 |

FOREIGN PATENT DOCUMENTS

| JP | 2006070881 A | 3/2006 |
| JP | 2013167203 A | 8/2013 |
| JP | 2014-211113 A | 11/2014 |

* cited by examiner

*Primary Examiner* — Michael D. Yaary
(74) *Attorney, Agent, or Firm* — Hunton Andrews Kurth LLP (57) ABSTRACT

A second core calculates an intervening variable that is defined by an inner function, when a time derivative of a state variable is expressed by a function having the state variable, the inner function, and an observable input variable as independent variables. A first core calculates a function by using respective values of the state variable, the intervening variable, and the input variable, and obtains a value of the state variable by time-integration of a value of the function. In the calculation of the function, the value of the state variable calculated in previous time, a value of the intervening variable calculated by the second core in the previous time, and a value of the input variable inputted in this time are used.

8 Claims, 8 Drawing Sheets

SOFT SENSOR DEVICE FOR ACQUIRING A STATE VARIABLE BY CALCULATION USING A PLURALITY OF PROCESSOR CORES

CROSS-REFERENCE TO RELATED APPLICATION

This application is based on and claims the benefit of Japanese Patent Application No. 2016-098930, filed on May 17, 2016, which is incorporated by reference herein in its entirety.

BACKGROUND

Field

The present application relates to a soft sensor device that acquires a state variable by calculation.

Background Art

In recent years, a study on a soft sensor has been advanced, which estimates state variables including various physical quantities such as a temperature, a pressure, a speed, an acceleration, an angular velocity, a voltage, a current and a resistance value by calculation instead of actually measuring the state variables. A soft sensor refers to software in which the relationship that is established between a state variable desired to be estimated and an input variable that can be observed is described by a function. The software is implemented in a computer, and thereby functions as "a device" similar to a conventional sensor. In the present description, the device which is realized by implementing a soft sensor that is software in a computer that is hardware will be referred to as a "soft sensor device".

Responsiveness is required of a soft sensor device similarly to the conventional sensors. That is, reduction of the time period which is required until acquisition of a state variable that is desired to be estimated is required. The arithmetic capacities of calculation devices including a soft sensor device can be enhanced by enhancing the operating frequencies of cores. However, from the viewpoint of power efficiency, there is a limit in enhancement in performance by enhancing the operating frequency. Consequently, in recent years, attention has been focused on a multi-core processor in which a plurality of processor cores are loaded on a single semiconductor chip, and further, a many-core processor in which a larger number of processor cores are loaded, as disclosed in JP 2014-211113 A, for example. According to a multi-core processor and a many-core processor, the operating frequencies may be lower as compared with a single-core processor, when processing the same amount of arithmetic operation. Further, by performing parallel computation by assigning the task to be processed to a plurality of cores, the arithmetic operation time period can be reduced as compared with the case of performing calculation in a single core.

However, in using a multi-core processor and a many-core processor, it is necessary to pay attention to the sequential nature which the algorithm of the soft sensor has. According to the Amdahl's Law, when the program in which a ratio of an execution time period of a part capable of being parallelized is "a" is executed by using N of processor cores, an entire performance enhancement rate S is expressed by S=1/((1−a)+a/N). As is understandable from this, in the case of the program having an algorithm with a high sequential nature, it is difficult to enhance performance by increasing the number of cores. Further, as the number of cores is increased, a delay accompanying exchange of data among the cores becomes more remarkable.

Therefore, performance cannot be sufficiently enhanced, by only applying a multi-core processor and a many-core processor to a soft sensor device.

SUMMARY

The present application is made in the light of the problem as described above, and has an object to reduce an arithmetic operation time period that is required to acquire a state variable, in a soft sensor device that acquires the state variable which is an estimation object by calculation using a plurality of processor cores.

When a value of a state variable that is an estimation object changes in relation to an input variable that is observable, a soft sensor for estimating the state variable by calculation is expressed by expression 1 as follows. In the present description, the state variable that is the estimation object is expressed by "x", and the input variable that is observable is expressed by "u". Note that "x" is a vector having one or a plurality of state quantities as a component, and "u" is a vector having one or a plurality of input signals as a component.

[Expression 1]

$$\frac{dx}{dt} = f(x, g(x), u) \tag{1}$$

As shown in expression 1, in the soft sensor, a time derivative dx/dt of the state variable x is expressed by a function f(x, g(x), u) in which the state variable x, an inner function g(x) having the state variable x as an independent variable, and the input variable u are independent variables. As is understandable from the fact that the inner function g(x) is present in the function f(x, g(x), u), the soft sensor has a sequential structure. Therefore, when expression 1 is directly calculated, much time is required to acquire the state variable x, because the inner function g(x) is calculated first, and next, the function f(x, g(x), u) is calculated.

Consequently, the inventors relating to the present application parallelized calculation of expression 1 as described as follows.

First, an intervening variable v that is defined by the inner function g(x) as follows is prepared.

[Expression 2]

$$v = g(x) \tag{2}$$

Next, both sides of expression 2 are time-differentiated, and the relationship in expression 1 is used, whereby next expression 3 is obtained. A right side in expression 3 is expressed by a product of a partial derivative ∂g(x)/∂x of the inner function g(x) with respect to the state variable x and a function f(x, v, u).

[Expression 3]

$$\frac{dv(t)}{dt} = \frac{\partial g}{\partial x}(x(t))\frac{dx}{dt}(t) \tag{3}$$

$$= \frac{\partial g}{\partial x}(x(t))f(x(t), v(t), u(t))$$

By combining expression 1 and expression 3, an equivalent equation shown in expression 4 is obtained.

[Expression 4]

$$\frac{d}{dt}\begin{bmatrix} x(t) \\ v(t) \end{bmatrix} = \begin{bmatrix} f(x(t), v(t), u(t)) \\ \frac{\partial g}{\partial x}(x(t))f(x(t), v(t), u(t)) \end{bmatrix} \quad (4)$$

A first row in a right side in expression 4 expresses the function f(x, v, u), and inputs thereof are a state variable x(t), an intervening variable v(t) and an input variable u(t). Further, a second row expresses a product of the partial derivative $\partial g(x)/\partial x$ and the function f(x, v, u), and inputs of the second row are also the state variable x(t), the intervening variable v(t), and the input variable u(t). All of the state variable x(t), the intervening variable v(t) and the input variable u(t) are variables determined by time, and are not functions of other variables. That is, expression 4 does not include a sequential structure.

Expression 4 is one selection for performing calculation in expression 1 by parallelizing the expression, and is a specific selection that can eliminate a sequential structure that expression 1 has. Eliminating a sequential structure of an algorithm is an especially important matter in enhancing a speed of an arithmetic operation using a plurality of processor cores. The inventors relating to the present application reduces an arithmetic operation time period that is required to acquire the state variable x by configuring the soft sensor device so that parallel computation expressed by expression 4 is performed by using a plurality of processor cores. Hereinafter, a configuration of the soft sensor device of the present application will be described.

A soft sensor device of the present application includes a first arithmetic operation device configured to perform an arithmetic operation by using one processor core (a plurality of processor cores may be used), and a second arithmetic operation device configured to perform an arithmetic operation by using one or a plurality of processor cores that is or are different from the processor cores that is or are used in the first arithmetic operation device. When the soft sensor device includes a multi-core processor or a many-core processor, both the first arithmetic operation device and the second arithmetic operation device may be included in the single multi-core processor or the single many-core processor.

The first arithmetic operation device is programmed to calculate the function f(x, v, u) by using respective values of the state variable x, the intervening variable v, and the input variable u, and further obtain a value of the state variable x by time-integrating a value of the function f(x, v, u). The second arithmetic operation device is programmed to calculate the intervening variable v that is used as the input in the first arithmetic operation device. In the calculation of the function f(x, v, u) by the first arithmetic operation device, a value of the state variable x that is calculated in the first arithmetic operation device in processing of a previous time, a value of the intervening variable v that is calculated in the second arithmetic operation device in the processing of the previous time, and a value of the input variable u that is inputted in processing of this time are used.

According to the soft sensor device configured as above, the value of the intervening variable v that is calculated in advance in the second arithmetic operation device is used in the calculation of the function f(x, v, u) by the first arithmetic operation device, so that the state variable x that is desired to be estimated can be acquired with high responsiveness by an arithmetic operation at a high speed due to no sequential processing.

In more detail, the second arithmetic operation device may be programmed to calculate a product of the partial derivative $\partial g(x)/\partial x$ and the function f(x, v, u), by using the value of the state variable x that is calculated in the first arithmetic operation device in the processing of the previous time, the value of the intervening variable v that is calculated in the second arithmetic operation device in the processing of the previous time, and the value of the input variable u that is inputted in the processing of this time. That is, components in the second row in the right side of expression 4 may be integrally calculated. In this case, the second arithmetic operation device is programmed to obtain the value of the intervening variable v by time-integrating a value that is obtained in the calculation.

Alternatively, the second arithmetic operation device may be programmed to calculate the partial derivative $\partial g(x)/\partial x$ by using the value of the state variable x that is calculated in the first arithmetic operation device in the processing of the previous time, and acquire a value of the function f(x, v, u) that is calculated in the first arithmetic operation device in the processing of this time. That is, the component in the second row in the right side of expression 4 is divided into the partial derivative $\partial g(x)/\partial x$ and the function f(x, v, u), and only the partial $\partial g(x)/\partial x$ may be calculated. In this case, the second arithmetic operation device is programmed to obtain the value of the intervening variable v by time-integrating a value that is obtained by multiplying a value of the partial derivative $\partial g(x)/\partial x$ that is obtained by the calculation, and the value of the function f(x, v, u) that is acquired from the first arithmetic operation device.

When the inner function g(x) is a composite function that is expressed by expression 5 as follows, and has a sequential structure including n of functions $g_n, \ldots, g_2$ and $g_1$ that are two or more, expression 4 can be further parallelized.

[Expression 5]

$$g(x) = g_n \circ \ldots \circ g_2 \circ g_1(x) \quad (5)$$

Here, the intervening variable $v_i$ is defined as in expression 6 and expression 7 as follows. Note that i represents an integer that is n or smaller and larger than 1. As shown in expression 8, the intervening variable $v_n$ corresponds to the aforementioned intervening variable v.

[Expression 6]

$$v_1 = g_1(x) \quad (6)$$

[Expression 7]

$$v_i = g_i(v_{i-1}) \quad (7)$$

[Expression 8]

$$v = v_n \quad (8)$$

By time-differentiating both sides in expression 6 and expression 7, expression 9 and expression 10 as follows are obtained.

[Expression 9]

$$\frac{dv_1(t)}{dt} = \frac{\partial g_1}{\partial x}(x(t))\frac{dx}{dt}(t) \quad (9)$$

$$= \frac{\partial g_1}{\partial x}(x(t))f(x(t), v_n(t), u(t))$$

[Expression 10]

$$\frac{dv_i(t)}{dt} = \frac{\partial g_i}{\partial v_{i-1}}(v_{i-1}(t))\frac{dv_{i-1}}{dt}(t) \quad (10)$$

$$= \frac{\partial g_i}{\partial v_{i-1}}(v_{i-1}(t))\frac{\partial g_{i-1}}{\partial v_{i-2}}(v_{i-2}(t)) \cdots \frac{\partial g_2}{\partial v_1}(v_1(t))$$

$$\frac{\partial g_1}{\partial x}(x(t))f(x(t), v_n(t), u(t))$$

An equivalent equation shown in expression 11 is obtained by further parallelizing expression 4 by using expression 9 and expression 10 based on the relationship shown in expression 5.

[Expression 11]

$$\frac{d}{dt}\begin{bmatrix} x(t) \\ v_1(t) \\ v_2(t) \\ \vdots \\ v_n(t) \end{bmatrix} = \quad (11)$$

$$\begin{bmatrix} f(x(t), v(t), u(t)) \\ \frac{\partial g_1}{\partial x}(x(t))f(x(t), v_n(t), u(t)) \\ \frac{\partial g_2}{\partial v_1}(v_1(t))\frac{\partial g_1}{\partial x}(x(t))f(x(t), v_n(t), u(t)) \\ \vdots \\ \frac{\partial g_n}{\partial v_{n-1}}(v_{n-1}(t)) \cdots \frac{\partial g_2}{\partial v_1}(v_1(t))\frac{\partial g_1}{\partial x}(x(t))f(x(t), v_n(t), u(t)) \end{bmatrix}$$

If parallel computation expressed by expression 11 is performed by using a plurality of processor cores, the first arithmetic operation device may perform an arithmetic operation of a component in a first row in a right side of expression 11, and the second arithmetic operation device may perform arithmetic operations of respective components from a second row through an n+1$^{th}$ row in the right side. In more detail, the first arithmetic operation device may perform an arithmetic operation of the component in the first row in the right side, and may obtain the value of the state variable x by time-integrating the value obtained by the arithmetic operation. The second arithmetic operation device may obtain the value of the intervening variable $v_n$ that is used in the arithmetic operation of the function f(x, $v_n$, u) in the first arithmetic operation device by time-integrating a value of the component in the n+1$^{th}$ row that is obtained by the arithmetic operation. If the second arithmetic operation device has a plurality of processor cores, not only the arithmetic operation time period in the first arithmetic operation device but also the arithmetic operation time period that is required to acquire the intervening variable $v_n$ in the second arithmetic operation device can be reduced, by performing the arithmetic operations of the respective components from the second row through the n+1$^{th}$ row in the right side by different processor cores respectively.

In more detail, a processor core that performs an arithmetic operation of a component in an i+1$^{th}$ row in the right side of expression 11 may be programmed to calculate a product of i of partial derivatives from a partial derivative $\partial g_i(x(t))/\partial x$ through a partial derivative $\partial g_i(v_{i-1}(t))/\partial v_{i-1}$, and the function f(x, v, u), by using the value of the state variable x that is calculated in the first arithmetic operation device in the processing of the previous time, respective values of i−1 of intervening variables from an intervening variable $v_1$ through an intervening variable $v_{i-1}$ that are calculated in other processor cores in the processing of the previous time, the value of the intervening variable v that is calculated in the second arithmetic operation device in the processing of the previous time, and the value of the input variable u that is inputted in the processing of this time, and obtain a value of the intervening variable $v_i$ by time-integrating a value of the product.

Alternatively, the processor core that performs an arithmetic operation of a component in the i+1$^{th}$ row in the right side of expression 11 may be programmed to calculate a value of a partial derivative $\partial g_i(v_{i-1}(t))/\partial v_{i-1}$ by using a value of an intervening variable $v_{i-1}$ that is calculated in another processor core that performs an arithmetic operation of a component in an i$^{th}$ row in the right side of expression 11 in the processing of the previous time, and obtain a value of the intervening variable $v_i$ by time-integrating a value that is obtained by multiplying the value of the partial derivative $\partial g_i(v_{i-1}(t))/\partial v_{i-1}$, and a value of the component in the i$^{th}$ row in the right side of expression 11 described above that is calculated in the other processor core in the processing of this time.

As described above, according to the soft sensor device according to the present application, the value of the intervening variable v that is calculated in advance in the second arithmetic operation device is used in calculation of the function f(x, v, u) by the first arithmetic operation device, so that the state variable x that is desired to be estimated can be acquired with high responsiveness by the arithmetic operation at a high speed due to no sequential processing.

DETAILED DESCRIPTION

1. Configuration Example of System Using Soft Sensor Device

A soft sensor device of the present application can be applied to a monitoring device that monitors a state variable x. Further, the soft sensor device of the present application can be also applied to a control system that performs an operation to a control object based on the state variable x of the control object. Here, several configuration examples in a case where the soft sensor device of the present application is applied to a control system will be described.

Figure 1:
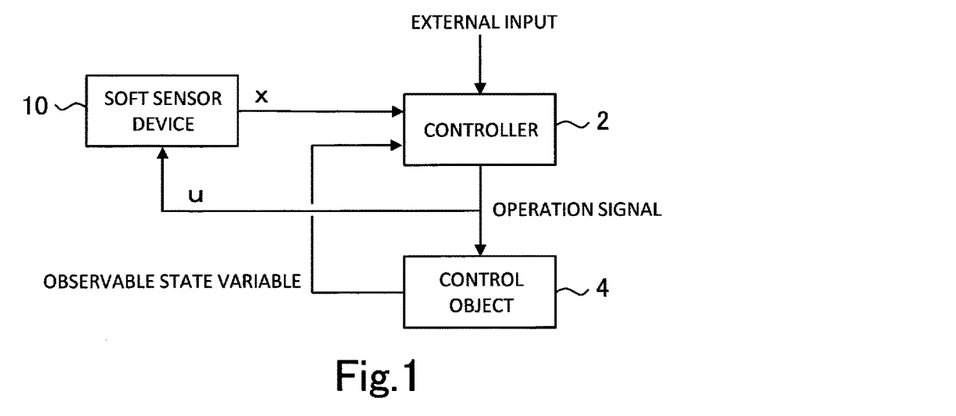
FIG. 1 is a diagram illustrating a configuration example 1 in a case where a soft sensor device is applied to a control system.
Figure 2:
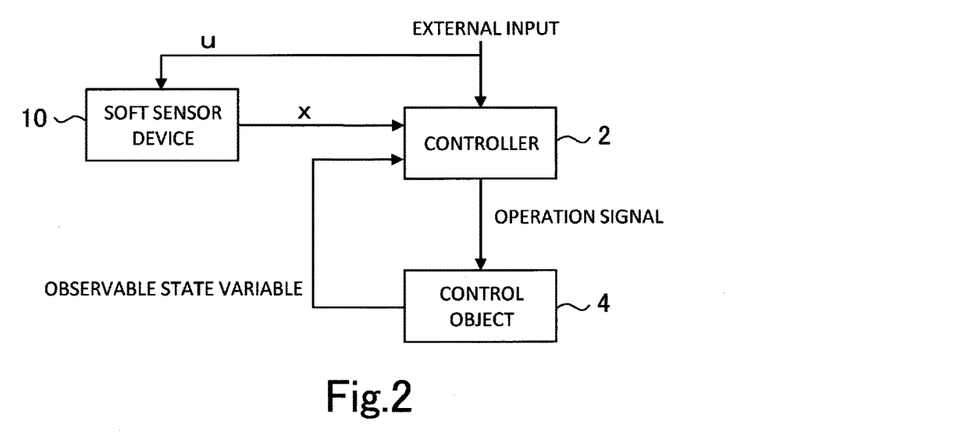
FIG. 2 is a diagram illustrating a configuration example 2 in the case where the soft sensor device is applied to the control system.
Figure 3:
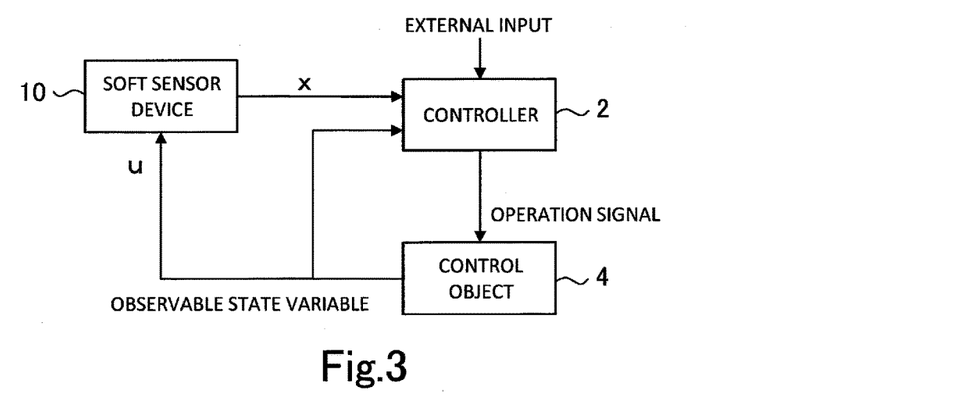
FIG. 3 is a diagram illustrating a configuration example 3 in the case where the soft sensor device is applied to the control system.

In each of configuration examples illustrated in FIGS. 1 to 3, a control system is configured by a controller 2, a control object 4, and a soft sensor device 10. The control object 4 is not limited. However, a state variable (a vector having one or a plurality of state quantities as a component) of the control object 4 is observed by a sensor (an ordinary sensor which is not a soft sensor) not illustrated. The observable state variable is not included in the state variable x that is estimated by the soft sensor device 10.

A control method of the controller 2 is not limited. However, in the controller 2, an operation signal for controlling the control object 4 is generated based on the state variable that is observed, an external input by an operator or an external sensor, for example, and the state variable x of the control object 4 that is estimated by the soft sensor device 10.

In a configuration example 1 illustrated in FIG. 1, an operation signal that is given to the control object 4 from the controller 2 is used as an input variable u to the soft sensor device 10. If there is a relationship between a change of the state variable x and an operation to the control object 4, the state variable x can be estimated based on the operation signal by creating a function f(x, g(x), u) with the operation signal as the input variable u.

In a configuration example 2 illustrated in FIG. 2, an external input that is given to the controller 2 is used as the input variable u to the soft sensor device 10. The operation signal that is given to the control object 4 is generated based on the external input, and therefore, a relationship may be also found between the external input and the state variable x. If there is a relationship between the change of the state variable x and the external input, the state variable x can be estimated based on the external input by creating the function f(x, g(x), u) with the external input as the input variable u.

In a configuration example 3 illustrated in FIG. 3, an observable state variable is used as the input variable u to the soft sensor device 10. For example, two different state quantities may be related with each other as a relationship between a pressure and a temperature, for example. If there is a relationship between a change of the state variable x and the observable state variable, the state variable x can be estimated based on the observable state variable by creating the function f(x, g(x), u) using the observable state variable as the input variable u.

Note that in each of the configuration examples described above, the function f(x, g(x), u) may be a function that models the control object 4 based on a physical law, or may be a function that is obtained based on an empirical rule.

Further, in each of the configuration examples described above, the soft sensor device 10 and the controller 2 are separate bodies, but the two may be integrally configured. For example, a single computer may be caused to function as the soft sensor device 10, and may be also caused to function as the controller 2.

2. Structure of Soft Sensor Device

Figure 4:
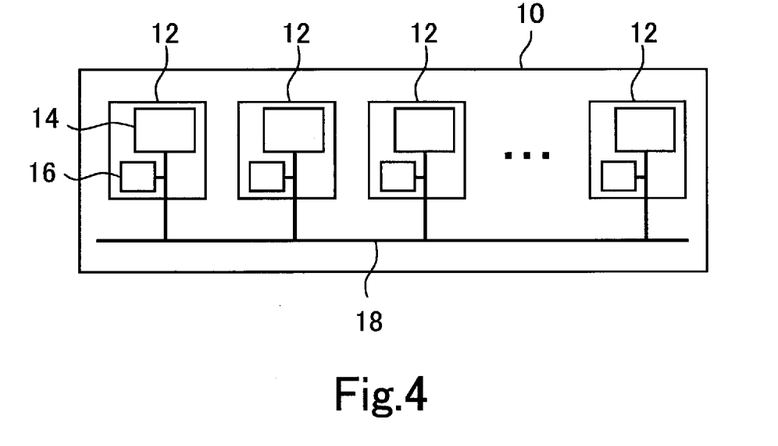
FIG. 4 is a schematic diagram illustrating an example of a hardware architecture of a processor included by the soft sensor device.

The soft sensor device 10 is configured by using a multi-core processor or a many-core processor having a plurality of processor cores (hereinafter, simply referred to as cores). FIG. 4 is a schematic diagram illustrating an example of a hardware architecture of the soft sensor device 10. Each of cores 12 includes a CPU 14 equipped with a cache, and a local memory 16, and the cores 12 are connected to one another with a bus 18. In the local memory 16, various programs that are executed in the CPU 14 and various data that are used at a time of execution of the programs are stored. Although not illustrated, a shared memory that is shared by the cores is also connected to the bus 18.

Figure 5:
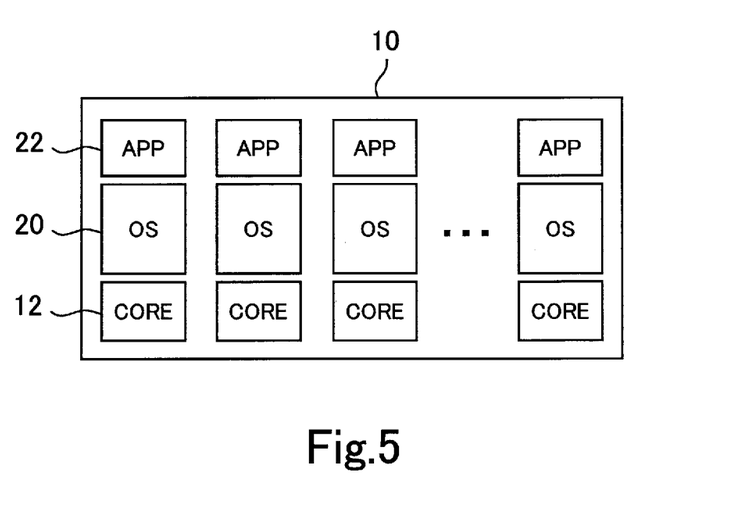
FIG. 5 is a schematic diagram illustrating an example of a software architecture of the processor included by the soft sensor device.

FIG. 5 is a schematic diagram illustrating an example of a software architecture of the soft sensor device 10. In the soft sensor device 10, different OSs 20 operate on the respective cores 12. Further, different applications 22 operate on the respective OSs 20. The soft sensor as the software is one of those applications 22. The OS 20 and the application 22 that are related with each of the cores 12 are installed in the local memory 16 in each of the cores 12. In the multi-core processor (or the many-core processor) having the software architecture like this, each of the cores 12 can individually execute the application 22. When an arithmetic operation result by another core 12, or data of another core 12 is required to execute the application 22, the data is exchanged by inter-core communication (inter-OS communication) through the bus 18.

3. Embodiments of Soft Sensor Device

Hereinafter, embodiments of the soft sensor device will be described with reference to the drawings.

3-1. First Embodiment

Figure 6:
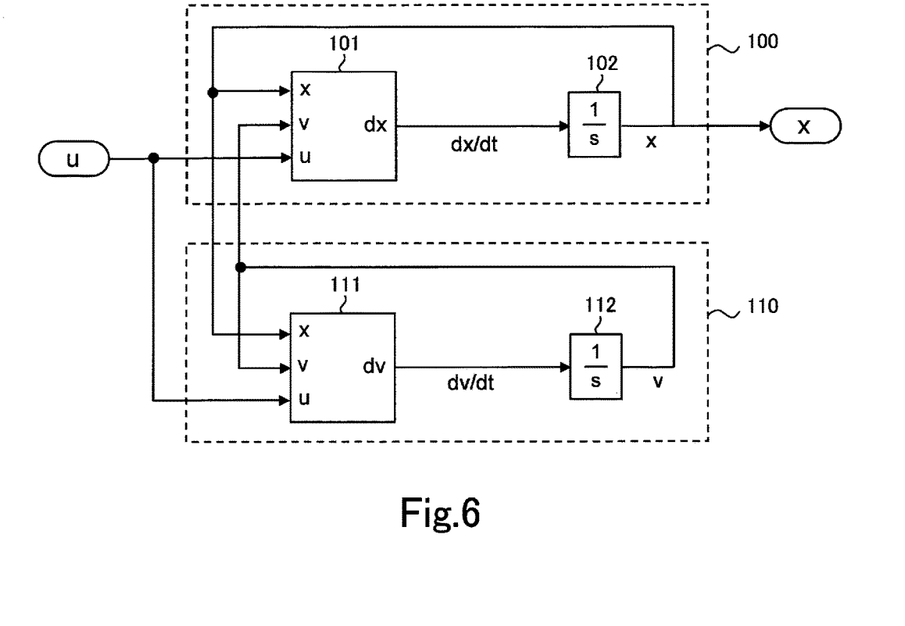
FIG. 6 is a block diagram illustrating a logic of a soft sensor device of a first embodiment.

FIG. 6 is a block diagram illustrating a logic of a soft sensor device of a first embodiment. In the first embodiment, parallel computation expressed by expression 4 is performed by using two cores 100 and 110. The cores 100 and 110 are part of the plurality of cores 12 illustrated in FIGS. 4 and 5. A first core 100 is a core that configures a first arithmetic operation device, and is programmed to perform calculation of a first row in a right side of expression 4, and integration of a value that is obtained by the calculation. A second core 110 is a core that configures a second arithmetic operation device, and is programmed to perform calculation of a second row in the right side of expression 4, and integration of a value that is obtained by the calculation.

The first core 100 is programmed to function as an arithmetic operator 101 and an integrator 102. To the arithmetic operator 101, a value of the state variable x that is calculated by the first core 100 in processing of a previous time, a value of an intervening variable v that is calculated by the second core 110 in the processing of the previous time, and a value of the input variable u that is inputted in processing of this time are inputted. The arithmetic operator 101 is configured to calculate the function f(x, v, u) by using the respective values of the state variable x, the intervening variable v, and the input variable u. By calculating the function f(x, v, u), a time derivative dx/dt of the state variable x is obtained. By time-integrating a value of the time derivative dx/dt that is outputted from the arithmetic operator 101, a value (a value of the processing of this time) of the state variable x that is an estimation object is obtained.

The second core 110 is programmed to function as an arithmetic operator 111 and an integrator 112. To the arithmetic operator 111, the value of the state variable x that is calculated by the first core 100 in the processing of the previous time, the value of the intervening variable v that is calculated by the second core 110 in the processing of the previous time, and the value of the input variable u that is inputted in the processing of this time are inputted. The arithmetic operator 111 is configured to calculate a product of a partial derivative ∂g(x)/∂x of an inner function g(x) with respect to the state variable x, and the function f(x, v, u), that is, a function ∂g(x)/∂x*f(x, v, u), by using the respective values of the state variable x, the intervening variable v and the input variable u. By calculating the function ∂g(x)/∂x*f(x, v, u), the time derivative dv/dt of the intervening variable v is obtained. By time-integrating the value of the time derivative dv/dt that is outputted from the arithmetic operator 111 in the integrator 112, a value (a value in the processing of this time) of the intervening variable v is obtained. The value of the intervening variable v that is obtained in the processing of this time is used in calculation of the function f(x, v, u) by the first core 100 in processing of a next time.

Figure 7:
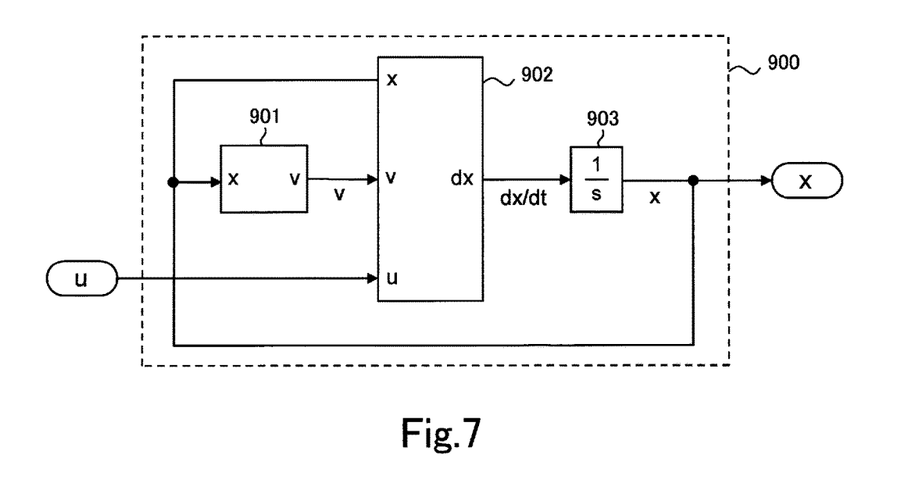
FIG. 7 is a block diagram illustrating a logic of a soft sensor device of a comparative example.

Here, a comparative example to the soft sensor device of the first embodiment will be cited. FIG. 7 is a block diagram illustrating a logic of a soft sensor device of the comparative example. In the comparative example, a soft sensor expressed by expression 1 is implemented in a single-core processor.

In the soft sensor device of the comparative example, a core 900 is programmed to function as a first arithmetic operator 901, a second arithmetic operator 902, and an integrator 903. To the first arithmetic operator 901, a value of the state variable x that is calculated by the core 900 in processing of a previous time is inputted. The first arithmetic operator 901 is configured to calculate the inner function g(x) by using the value of the state variable x. By calculating the inner function g(x), the intervening variable v is obtained.

To the second arithmetic operator 902, the value of the state variable x that is calculated by the core 900 in the processing of the previous time, a value of the intervening variable v that is calculated by the first arithmetic operator 901 in processing of this time, and a value of the input variable u that is inputted in the processing of this time are inputted. The second arithmetic operator 902 is configured to calculate the function f(x, v, u) by using the respective values of the state variable x, the intervening variable v and the input variable u. By calculating the function f(x, v, u), the time derivative dx/dt of the state variable x is obtained. By time-integrating the value of the time derivative dx/dt that is outputted from the second arithmetic operator 902 by the integrator 903, a value (a value in the processing of this time) of the state variable x that is an estimation object is obtained.

Figure 8:
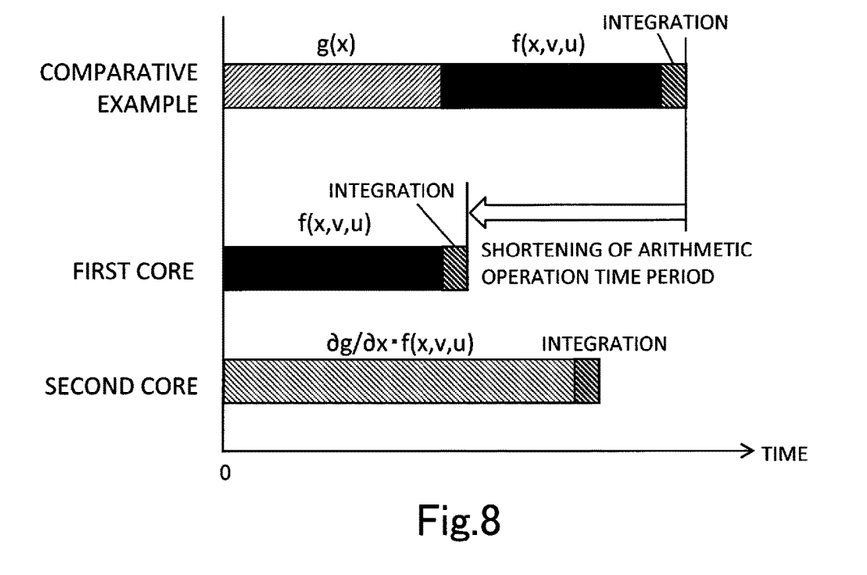
FIG. 8 is a diagram comparing and illustrating arithmetic operation time periods in the soft sensor device of the first embodiment and the comparative example.

FIG. 8 is a diagram comparing and illustrating operation time periods that are required until the value of the state variable x is obtained in the soft sensor device of the first embodiment and the comparative example. In the case of the comparative example, there is the sequential nature between the function f(x, g (x), u) and the inner function g(x), so that after calculation of the inner function g(x) is finished, the function f(x, v, u) is calculated by using the value of the intervening variable v that is obtained in the calculation of the inner function g(x). Therefore, in the case of the comparative example, an arithmetic operation time period that is required until the value of the state variable x is obtained is a total time period of an arithmetic operation time period of the inner function g(x), an arithmetic operation time period of the function f(x, v, u), and an arithmetic operation time period of time integration.

Meanwhile, in the case of the soft sensor device of the first embodiment, the value of the intervening variable v that is calculated in the second core 110 in the processing of the previous time is used in calculation of the function f(x, v, u) that is performed in the first core 100. Therefore, in the soft sensor device of the first embodiment, the arithmetic operation time period that is required until the value of the state variable x is obtained is reduced to a total time period of the arithmetic operation time period of the function f(x, v, u) and the arithmetic operation time period of the time integration. As is understandable from comparison with the comparative example, according to the soft sensor device of the first embodiment, the state variable x which is desired to be estimated can be acquired with high responsiveness by the arithmetic operation at a high speed due to no sequential processing.

In the second core 110, a total time period of an arithmetic operation time period of the function ∂g(x)/∂x*f(x, v, u) and an arithmetic operation time period of the time integration is required until the value of the intervening variable v is obtained. Depending on the arithmetic operation amount of the function ∂g(x)/∂x*f(x, v, u), the arithmetic operation time period that is required in the second core 110 may become longer than the arithmetic operation time period that is required in the first core 100, as illustrated in FIG. 8. However, as long as the arithmetic operation is completed in a cycle, and the value of the intervening variable V can be transferred to the first core 100 before the processing of the next time, that is, as long as time is not out, the responsiveness of the soft sensor device is not influenced by the arithmetic operation time period in the second core 110.

3-2. Second Embodiment

Figure 9:
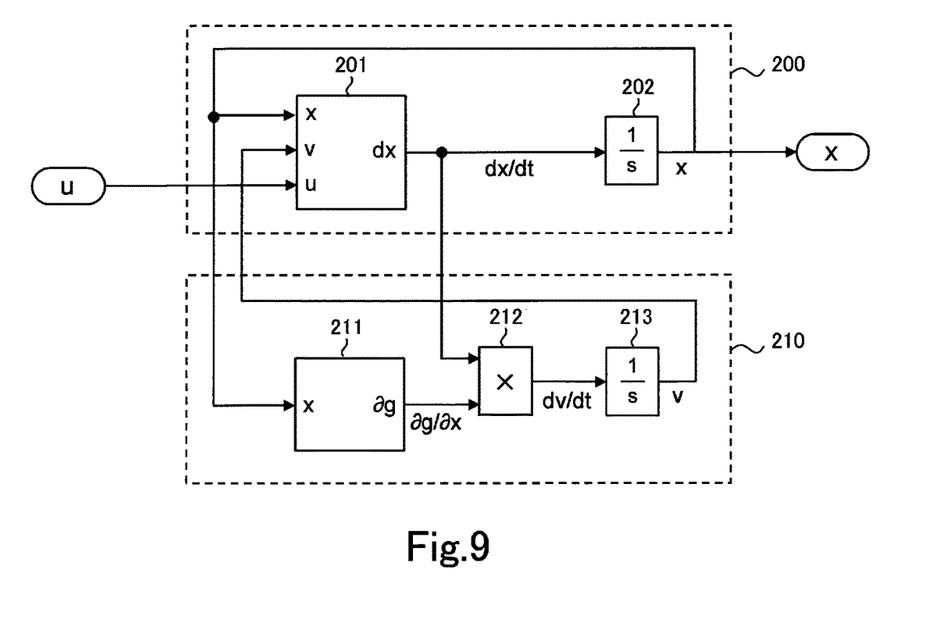
FIG. 9 is a block diagram illustrating a logic of a soft sensor device of a second embodiment.

FIG. 9 is a block diagram illustrating a logic of a soft sensor device of a second embodiment. In the second embodiment, the parallel computation expressed by expression 4 is performed by using two cores 200 and 210. These cores 200 and 210 are part of the plurality of cores 12 illustrated in FIGS. 4 and 5. The first core 200 is a core that configures the first arithmetic operation device, and is programmed to perform calculation of the first row in the right side of expression 4, and integration of a value that is obtained by the calculation. The second core 210 is a core that configures a second arithmetic operation device, and is programmed to perform calculation of the second row in the right side in expression 4, and integration of a value obtained by the calculation.

The first core 200 is programmed to function as an arithmetic operator 201 and an integrator 202. To the arithmetic operator 201, a value of the state variable x that is calculated by the first core 200 in processing of a previous time, a value of the intervening variable v that is calculated by the second core 210 in the processing of the previous time, and a value of the input variable u that is inputted in processing of this time are inputted. The arithmetic operator 201 is configured to calculate the function f(x, v, u) by using the respective values of the state variable x, the intervening variable v and the input variable u. By calculating the function f(x, v, u), the time derivative dx/dt of the state variable x is obtained. By time-integrating the value of the time derivative dx/dt that is outputted from the arithmetic operator 201 by the integrator 202, a value (a value in the processing of this time) of the state variable x that is an estimation object is obtained.

The second core 210 is programmed to function as an arithmetic operator 211, a multiplier 212 and an integrator 213. To the arithmetic operator 211, the value of the state variable x that is calculated by the first core 200 in the processing of the previous time is inputted. The arithmetic operator 211 is configured to calculate the partial derivative $\partial g(x)/\partial x$ of the inner function g(x) with respect to the state variable x. To the multiplier 212, the value of the partial derivative $\partial g(x)/\partial x$ that is calculated by the arithmetic operator 211, and a value of the function f(x, v, u) that is calculated by the first core 200 in the processing of this time are inputted. The multiplier 212 is configured to multiply the value of the partial derivative $\partial g(x)/\partial x$ and the value of the function f(x, v, u) that are inputted. A value obtained by the calculation is equivalent to a value of the time derivative dv/dt of the intervening variable v. The value of the time derivative dv/dt that is outputted from the multiplier 212 is time-integrated by the integrator 213, whereby a value (a value in the processing of this time) of the intervening variable v is obtained. The value of the intervening variable v that is obtained in the processing of this time is used in calculation of the function f(x, v, u) by the first core 200 in processing of a next time.

Figure 10:
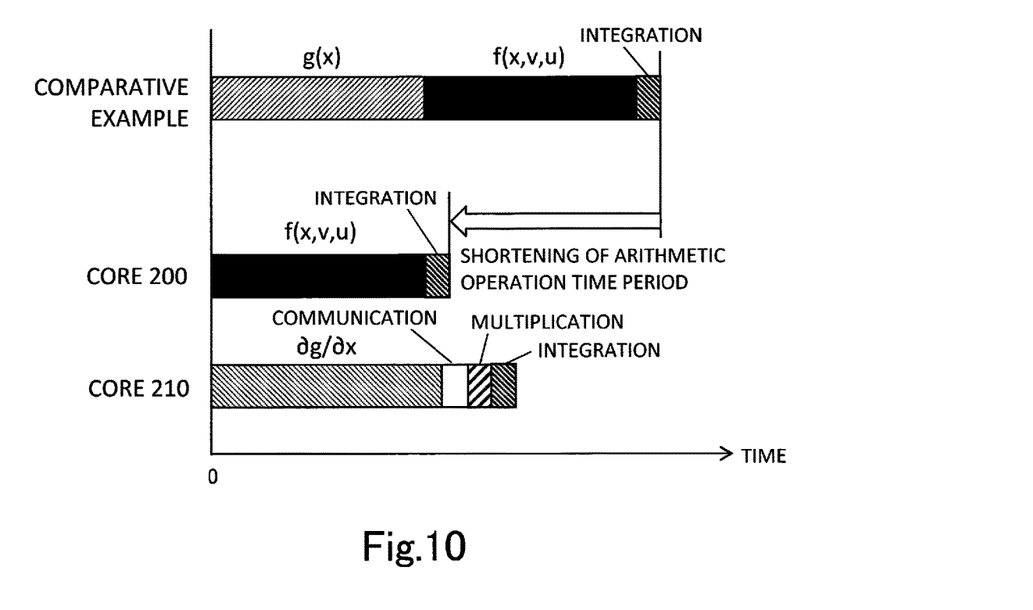
FIG. 10 is a diagram comparing and illustrating arithmetic operation time periods in the soft sensor device of the second embodiment and the comparative example.

Here, the comparative example illustrated in the first embodiment and the soft sensor device of the second embodiment will be compared with respect to the arithmetic operation time period. FIG. 10 is a diagram comparing and illustrating arithmetic operation time periods that are required until the value of the state variable x is obtained in the soft sensor device in the second embodiment and the comparative example. In the case of the comparative example, the arithmetic operation time period that is required until the value of the state variable x is obtained is the total time period of the arithmetic operation time period of the inner function g(x), the arithmetic operation time period of the function f(x, v, u), and the arithmetic operation time period of the time integration, since there is the sequential nature between the function f(x, g (x), u) and the inner function g(x), as described above.

Meanwhile, in the case of the soft sensor device of the second embodiment, the value of the intervening variable v that is calculated by the second core 210 in the processing of the previous processing is used. Therefore, in the soft sensor device of the second embodiment 2, an arithmetic operation time period that is required until the value of the state variable x is obtained is reduced to a total time period of the arithmetic operation time period of the function f(x, v, u) and the arithmetic operation time period of the time integration. That is, according to the soft sensor device of the second embodiment, the state variable x that is desired to be estimated can be acquired with high responsiveness by the arithmetic operation at a high speed due to no sequential processing, similarly to the soft sensor device of the first embodiment.

In the second core 210, a total time period of the arithmetic operation time period of the partial derivative $\partial g(x)/\partial x$, a communication time period that is required to receive the value of the function f(x, v, u) from the first core 200 by inter-core communication, an arithmetic operation time period of multiplication, and the arithmetic operation time period of time integration is required until the value of the intervening variable v is obtained. When comparing with the arithmetic operation time period of the second core 110 in the first embodiment, the arithmetic operation time period of the second core 210 in the second embodiment is considered to be shorter, due to a difference between an arithmetic operation amount of the partial derivative $\partial g(x)/\partial x$ and an arithmetic operation amount of the function $\partial g(x)/\partial x * f(x, v, u)$. However, it is also conceivable that the arithmetic operation time period of the second core 210 becomes longer due to the communication time period that is required for inter-core communication. Therefore, for an object with the communication time period of the inter-core communication including a time period of access to the memory being short for the arithmetic operation amount, the logic of the second embodiment can be said as suitable as the logic of the soft sensor device. Conversely, for an object with the communication time period of the inter-core communication being long for the arithmetic operation amount, the logic of the first embodiment can be said as suitable.

3-3. Third Embodiment

Figure 11:
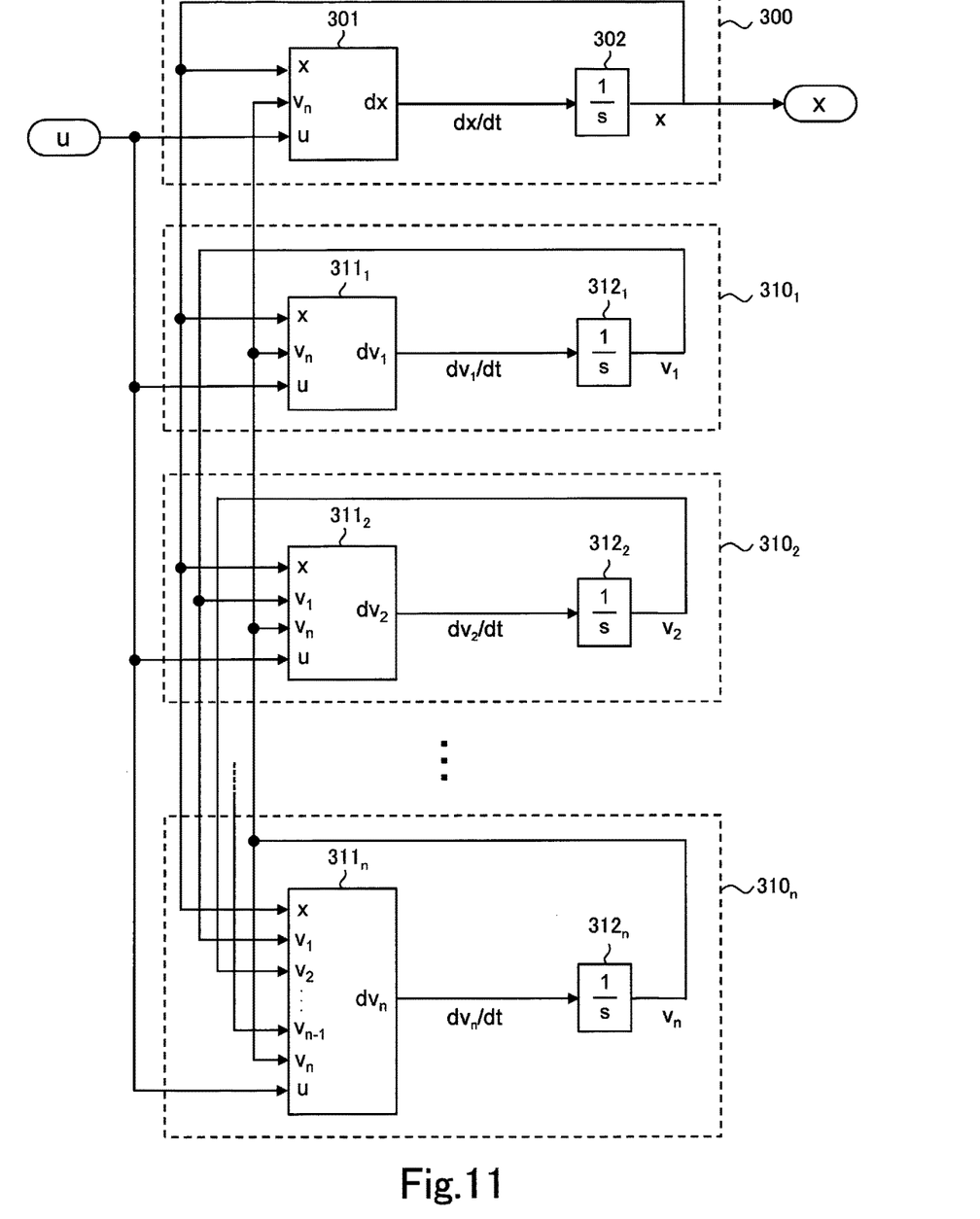
FIG. 11 is a block diagram illustrating a logic of a soft sensor device of a third embodiment.

FIG. 11 is a block diagram illustrating a logic of a soft sensor device of a third embodiment. In the third embodiment, parallel computation expressed by expression 11 is performed by using n+1 of cores 300, $310_1$ to $310_n$. These cores 300 and $310_1$ to $310_n$ are part of the plurality of cores 12 illustrated in FIGS. 4 and 5. A first core 300 is a core that configures a first arithmetic operation device, and is programmed to perform calculation of a first row in a right side of expression 11, and integration of a value that is obtained by the calculation. Cores as many as n from a second core $310_1$ through the n+1$^{th}$ core $310_n$ are cores that configure a second arithmetic operation device. The i+1$^{th}$ core $310_i$ that is included in the second arithmetic operation device is programmed to perform calculation of an i+1$^{th}$ row in the right side of expression 11, and integration of a value obtained by the calculation (i represents integers from 1 through n).

The first core 300 is programmed to function as an arithmetic operator 301 and an integrator 302. To the arithmetic operator 301, a value of the state variable x that is calculated by the first core 300 in processing of a previous time, a value of an intervening variable $v_n$ that is calculated by the n+1$^{th}$ core 310, in the processing of the previous time, and a value of the input variable u that is inputted in processing of this time are inputted. The arithmetic operator 301 is configured to calculate the function f(x, $v_n$, u) by using the respective values of the state variable x, the intervening variable $v_n$, and the input variable u. By calculating the function f(x, $v_n$, u), a time derivative dx/dt of the state variable x is obtained. By performing time-integration of a value of the time derivative dx/dt that is outputted from the arithmetic operator 301 in the integrator 302, a value (a value in the processing of this time) of the state variable x that is an estimation object is obtained.

The second core $310_1$ is programmed to function as an arithmetic operator $311_1$ and an integrator $312_1$. To the arithmetic operator $311_1$, the value of the state variable x that is calculated by the first core 300 in the processing of the previous time, the value of the intervening variable $v_n$ that is calculated by the n+1$^{th}$ core $310_n$ in the processing of the previous time, and the value of the input variable u that is inputted in the processing of this time are inputted. The arithmetic operator $311_1$ is configured to calculate a product of the partial derivative $\partial g_i(x)/\partial x$ by the state variable x of an inner function $g_1(x)$, and the function f(x, v, u), that is, a function $\partial g_i(x)/\partial x * f(x, v_n, u)$, by using the respective values of the state variable x, the intervening variable $v_n$ and the input variable u. This does not include a sequential structure, and therefore, an arithmetic operation by the arithmetic operator $311_1$ is performed at a high speed.

By calculating the function $\partial g_i(x)/\partial x * f(x, v, u)$, the time derivative $dv_1/dt$ of the intervening variable $v_1$ is obtained. By time-integrating the value of the time derivative $dv_1/dt$ that is outputted from the arithmetic operator $311_1$ in the integrator $312_1$, a value (a value in the processing of this time) of the intervening variable $v_1$ is obtained. The value of the intervening variable $v_1$ that is obtained in the processing of this time is used in arithmetic operations in the respective cores from the third core $310_2$ through the n+1$^{th}$ core $310_n$ in processing of a next time.

Next, the respective cores from the third core $310_2$ through the n+1$^{th}$ core $310_n$ will be described. Here, when "i" is set as an arbitrary integer from 2 through n, the i+1$^{th}$ core $310_i$ is programmed to function as an arithmetic operator $311_i$ and an integrator $312_i$. To the arithmetic operator $311_i$, the value of the state variable x that is calculated by the first core 300 in the processing of the previous time, respective values of i−1 of intervening variables from the intervening variable $v_1$ through the intervening variable $v_{i-1}$ that are calculated by the cores from the second core $310_1$ through an i$^{th}$ core $310_{i-1}$ in the processing of the previous time, the value of the intervening variable $v_n$ that is calculated by the n+1$^{th}$ core $310_n$ in the processing of the previous time, and a value of the input variable u that is inputted in the processing of this time are inputted.

An arithmetic operator $311_i$ is configured to calculate a product of i of partial derivatives from a partial derivative $\partial g_1(x(t))/\partial x$ through a partial derivative $\partial g_i(v_{i-1}(t)/\partial v_{i-1}$ and the function f(x, $v_n$, u), that is, a function $\partial g_i(v_{i-1}(t)/\partial v_{i-1} * \ldots * \partial g_i(x(t))/\partial x * f(x, v_n, u)$, by using the respective values of the state variable x, the intervening variable $v_1$ to $v_{i-1}$ and the input variable u. This does not include a sequential structure, and therefore, an arithmetic operation by the arithmetic operator $311_i$ is performed at a high speed.

By calculating a function $\partial g_i(v_{i-1}(t))/\partial v_{i-1} * \ldots * \partial g_1(t))/\partial x * f(x, v_n, u)$, a time derivative $dv_i/dt$ of an intervening variable $v_i$ is obtained. By time-integrating a value of the time derivative $dv_i/dt$ that is outputted from the arithmetic operator $311_i$ in the integrator $312_i$, a value (a value in the processing of this time) of the intervening variable $v_i$ is obtained. The value of the intervening variable $v_i$ that is obtained in the processing of this time is used in arithmetic operations in respective cores from an i+2$^{th}$ core $310_{i+1}$ through the n+1$^{th}$ core $310_n$ in the processing of the next time, when i is arbitrary integers from 2 through n−1. In a case of i being n, that is, in the case of the n+1$^{th}$ core $310_n$, the value of the intervening variable $v_n$ that is obtained in the processing of this time is used in arithmetic operations in all the cores including the first core 300 in the processing of the next time.

When estimation precision of the soft sensor is to be enhanced, the function f(x, g(x), u) that expresses the soft sensor is complicated, and the inner function g(x) includes a sequential structure with multiple stages. In this regard, if the arithmetic operation is performed in accordance with the above described logic, not only the sequential structure which the function f(x, g(x), u) has, but also the sequential structure which the inner function g(x) has is eliminated. Thereby, not only the arithmetic operation time period that is required to acquire the state variable x, but also the arithmetic operation time period that is required to acquire the intervening variable $v_n$ is reduced, and therefore, occurrence of timeout is avoided. That is, according to the third embodiment, it is possible to perform a high-speed arithmetic operation even for the function f(x, g(x), u) that has a complicated structure, so that the soft sensor device with excellent responsiveness and high precision can be obtained.

3-4. Fourth Embodiment

Figure 12:
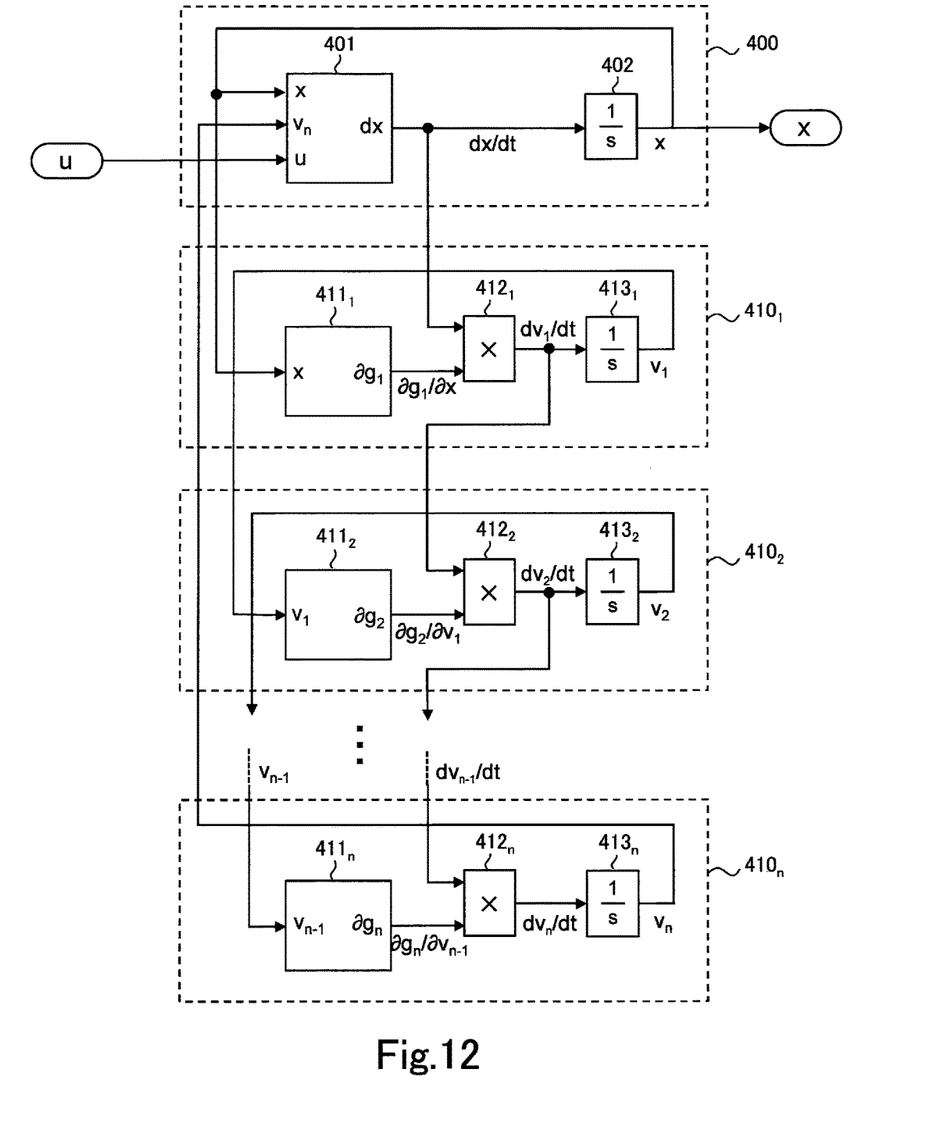
FIG. 12 is a block diagram illustrating a logic of a soft sensor device of a fourth embodiment.

FIG. 12 is a block diagram illustrating a logic of a soft sensor device of a fourth embodiment. In the fourth embodiment, the parallel computation expressed by expression 11 is performed by using n+1 of cores 400, $410_1$ to $410_n$. These cores 400, and $410_1$ to $410_n$ are part of the plurality of cores 12 illustrated in FIGS. 4 and 5. A first core 400 is a core that configures a first arithmetic operation device, and is programmed to perform calculation of the first row in the right side of expression 11, and integration of a value that is obtained by the calculation. Cores as many as n from a second core $410_1$ to the n+1$^{th}$ core $410_n$ are cores that configure a second arithmetic operation device. An i+1$^{th}$ core $410_i$ that is included in the second arithmetic operation device is programmed to perform calculation of an i+1$^{th}$ row in the right side of expression 11, and integration of a value that is obtained by the calculation (note that "i" represents integers from 1 through "n").

The first core 400 is programmed to function as an arithmetic operator 401 and an integrator 402. To the arithmetic operator 401, a value of the state variable x that is calculated by the first core 400 in processing of a previous time, a value of an intervening variable $v_n$ that is calculated by the n+1$^{th}$ core $410_n$ in the processing of the previous time, and a value of the input variable u that is inputted in processing of this time are inputted. The arithmetic operator 401 is configured to calculate the function f(x, $v_n$, u) by using the respective values of the state variable x, the intervening variable $v_n$, and the input variable u. By calculating the function f(x, $v_n$, u), the time derivative dx/dt of the state variable x is obtained. By performing time-integration of a value of the time derivative dx/dt that is outputted from the arithmetic operator 401 by the integrator 402, a value (a value in the processing of this time) of the state variable x that is an estimation object is obtained.

The second core $410_1$ is programmed to function as an arithmetic operator $411_1$, a multiplier $412_1$ and an integrator $413_1$. To the arithmetic operator $411_1$, the value of the state variable x that is calculated by the first core 400 in the processing of the previous time is inputted. The arithmetic operator $411_1$ is configured to calculate the partial derivative $\partial g_i(x)/\partial x$ of the inner function $g_i(x)$ with respect to the state variable x by using the value of the state variable x.

To the multiplier $412_1$, the value of the partial derivative $\partial g_i(x)/\partial x$ that is calculated by the arithmetic operator $411_1$, and a value of the function f(x, $v_n$, u) that is calculated by the first core 400 in the processing of this time are inputted. The multiplier $412_1$ is configured to multiply the value of the partial derivative ∂g_i(x)/∂x and the value of the function f(x, v_n, u) that are inputted. A value obtained by the calculation is equivalent to a value of the time derivative $dv_1/dt$ of the intervening variable $v_1$. The value of the time derivative $dv_1/dt$ that is outputted from the multiplier $412_1$ is time-integrated by the integrator $413_1$, whereby a value (a value in the processing of this time) of the intervening variable $v_1$ is obtained. The value of the intervening variable $v_1$ that is obtained in the processing of this time is used in an arithmetic operation in a third core $410_2$ in processing of the next time.

Next, the respective cores from the third core $410_2$ through the n+1$^{th}$ core $410_n$ will be described. Here, when i is set as an arbitrary integer from 2 through n, the i+1$^{th}$ core $410_i$ is programmed to function as an arithmetic operator $411_i$, a multiplier $412_i$ and an integrator $413_i$. To the arithmetic operator $411_i$, a value of an intervening variable $v_{i-1}$ that is calculated by the i$^{th}$ core $410_{i-1}$ in the previous processing is inputted. An arithmetic operator $411_i$ is configured to calculate a partial derivative $\partial g_i(x)/\partial v_{i-1}$ of the inner function $g_i(x)$ with respect to the intervening variable $v_{i-1}$ by using a value of the intervening variable $v_{i-1}$.

To the multiplier $412_i$, the value of the partial derivative $\partial g_i(x)/\partial v_{i-1}$ that is calculated by the arithmetic operator $411_i$, and a value of a time derivative $dv_{i-1}/dt$ that is calculated by the i$^{th}$ core $410_{i-1}$ in the processing of this time are inputted. The multiplier $412_i$ is configured to multiply the value of the partial derivative $\partial g_i(x)/\partial v_{i-1}$ and the value of the time derivative $dv_{i-1}/dt$ that are inputted. A value obtained by the calculation is equivalent to a value of the time derivative $dv_i/dt$ of the intervening variable $v_i$ as shown in expression 10. The value of the time derivative $dv_i/dt$ that is outputted from the multiplier $412_i$ is time-integrated by the integrator $413_i$, whereby a value (a value in the processing of this time) of the intervening variable $v_i$ is obtained. The value of the intervening variable $v_i$ that is obtained in the processing of this time is used in an arithmetic operation in an i+2$^{th}$ core $410_{i+1}$ in processing of a next time, when i is arbitrary integers from 2 through n−1. When i is n, that is, in the n+1$^{th}$ core $410_n$, the value of the intervening variable $v_n$ that is obtained in the processing of this time is used in an arithmetic operation in the first core 400 in the processing of the next time.

If the arithmetic operation is performed in accordance with the above described logic, not only the sequential structure which the function f(x, g(x), u) has, but also the sequential structure which the inner function g(x) has is eliminated. Therefore, according to the fourth embodiment, it is possible to perform a high-speed arithmetic operation of even the function f(x, g(x), u) that has a complicated structure, so that the soft sensor device with excellent responsiveness and high precision can be obtained, as in the third embodiment. When the fourth embodiment and the third embodiment are compared, for an object with the communication time period of the inter-core communication including a time period of access to the memory being short for the arithmetic operation amount, the logic of the fourth embodiment can be said as suitable as the logic of the soft sensor device. Conversely, for an object with the communication time period of the inter-core communication being long for the arithmetic operation amount, the logic of the third embodiment can be said as suitable.

4. Examples of Soft Sensor Device

Hereinafter, specific examples of the soft sensor device will be illustrated.

4-1. Example 1

Figure 13:
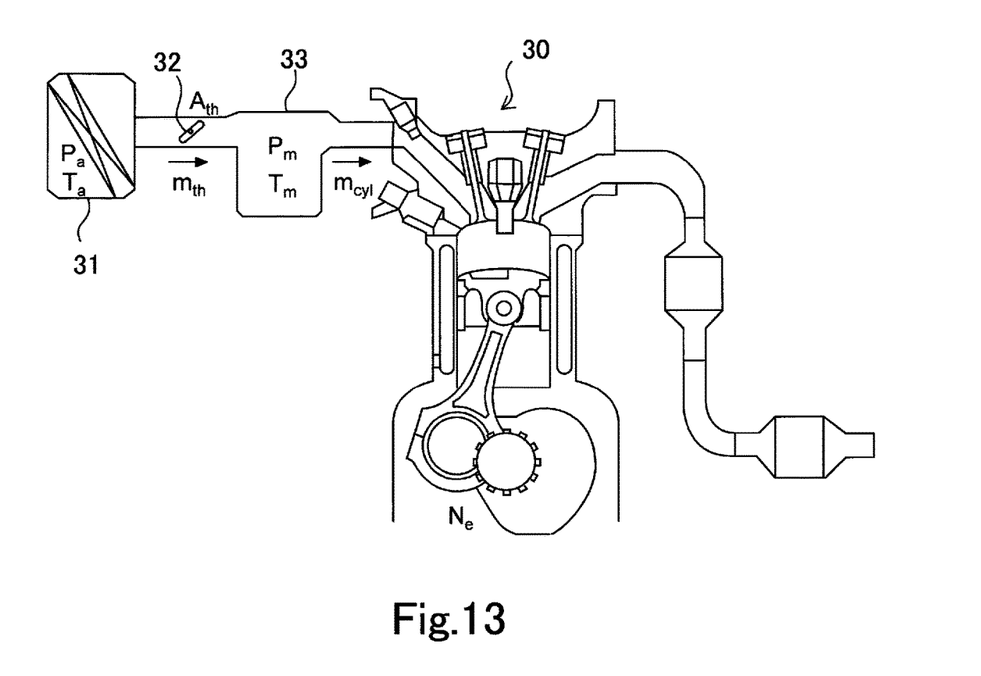
FIG. 13 is a schematic view of an internal combustion engine to which an intake pressure soft sensor device of example 1 is applied.
Figure 14:
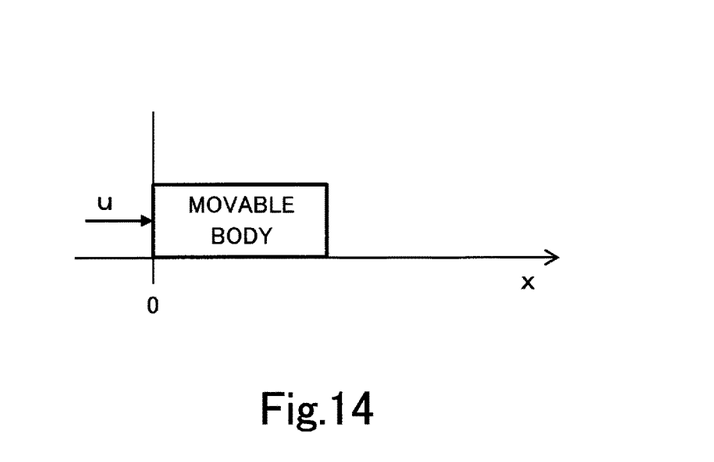
FIG. 14 is a diagram for explaining a position soft sensor device of example 2.

In example 1, the soft sensor device is used in estimation of the intake pressure of an internal combustion engine. FIG. 13 is a schematic view of an internal combustion engine 30 to which the intake pressure soft sensor device of example 1 is applied. First, when a gas constant is R, an atmospheric temperature in an inlet port of an air cleaner 31 is Ta, an atmospheric pressure in the inlet port of the air cleaner 31 is Pa, an opening degree area of a throttle 32 is $A_{th}$, and an intake pressure in an intake manifold 33 is Pm, a mass flow rate $m_{th}$ of air that passes through the throttle 32 can be expressed by expression 12 and expression 13 as follows in accordance with a known formula of a throttle.

[Expression 12]

$$m_{th} = A_{th}\frac{P_a}{\sqrt{RT_a}}\phi\left(\frac{P_m}{P_a}\right) \quad (12)$$

[Expression 13]

$$\phi\left(\frac{P_m}{P_a}\right) = \begin{cases} \frac{1}{\sqrt{2}} & 0 \leq \frac{P_m}{P_a} \leq 0.5 \\ \sqrt{2\frac{P_m}{P_a}\left(1 - \frac{P_m}{P_a}\right)} & 0.5 \leq \frac{P_m}{P_a} \leq 1 \end{cases} \quad (13)$$

Further, a time change dPm/dt of the intake pressure Pm can be expressed by expression 14 as follows when a volume of the intake manifold 33 is Vm, a temperature in the intake manifold 33 is Tm, and a mass flow rate of air that is taken into a cylinder is $m_{cyl}$.

[Expression 14]

$$\frac{dP_m}{dt} = \frac{RT_m}{V_m}(m_{th} - m_{cyl}) \quad (14)$$

The mass flow rate $m_{cyl}$ of the air that is taken into the cylinder can be expressed by expression 15 as follows. Note that ηv represents a volume efficiency, Ne represents an engine speed, and Vd represents a cylinder volume.

[Expression 15]

$$m_{cyl} = \eta_v \frac{P_m}{RT_m} \cdot \frac{Ne}{60} \cdot \frac{V_d}{2} \quad (15)$$

Here, when Tm, Ta, Pa and Ne are constant in the relationships shown in expression 12 to expression 15, the intake pressure soft sensor that is expressed by expression 16 and expression 17 as follows is obtained. Note that the state variable x in the intake pressure soft sensor is the intake pressure Pm, and the input variable u is the throttle opening degree area $A_{th}$.

[Expression 16]

$$\frac{dx}{dt} = f(x, v, u) \\ = K_1 \cdot v \cdot u - K_2 \cdot x \quad (16)$$

[Expression 17]

$$v = g(x) = \begin{cases} \frac{1}{\sqrt{2}} & 0 \le x < 0.5 \\ \sqrt{2x(1-x)} & 0.5 \le x \le 1 \end{cases} \quad (17)$$

Note that in expression 16, coefficients $K_1$ and $K_2$ are respectively defined by expression 18 and expression 19 as follows.

[Expression 18]

$$K_1 = \frac{1}{V_m} \cdot \frac{T_m}{\sqrt{T_a}} \cdot P_a \cdot \sqrt{R} \quad (18)$$

[Expression 19]

$$K_2 = \frac{\eta}{120} \cdot \frac{V_d}{V_m} \cdot Ne \quad (19)$$

The partial derivative $\partial g(x)/\partial x$ of the inner function $g(x)$ with respect to the state variable x shown in expression 17 is expressed by expression 20 as follows.

[Expression 20]

$$\frac{\partial g}{\partial x}(x(t)) = \begin{cases} 0 & 0 \le \frac{x}{P_a} < 0.5 \\ \frac{1}{2} \cdot \frac{\sqrt{2}(1-2x)}{\sqrt{x(1-x)}} & 0.5 \le \frac{x}{P_a} \le 1 \end{cases} \quad (20)$$

When the soft sensor device of the first embodiment is configured as the intake pressure soft sensor device, the function f(x, v, u) in expression 16 can be implemented in the arithmetic operator 101 of the first core 100 illustrated in FIG. 6. Further, a function $\partial g(x)/\partial x*f(x, v, u)$ that is expressed by the product of the partial derivative $\partial g(x)/\partial x$ in expression 20 and the function f(x, v, u) in expression 16 can be implemented in the arithmetic operator 111 of the second core 110.

When the soft sensor device of the second embodiment is configured as the intake pressure soft sensor device, the function f(x, v, u) in expression 16 can be implemented in the arithmetic operator 201 of the first core 200 illustrated in FIG. 9. Further, the partial derivative $\partial g(x)/\partial x$ in expression 20 can be implemented in the arithmetic operator 211 of the second core 210.

4-2. Example 2

In example 2, the soft sensor device is used in estimation of a position of a movable body. Here, it is assumed that relationships shown in expression 21 and expression 22 as follows are found between a propulsive force u that is applied to the movable body and a moved distance x in an x-axis direction of the movable body. The relationships may be theoretically obtained, or may be empirically obtained. Note that $K_1$ and $K_2$ in expression 21 are coefficients.

[Expression 21]

$$\frac{dx}{dt} = f(x, v, u) \\ = -K_1 \cdot x^2 \cdot v - K_2 \cdot x \cdot v^2 + u \quad (21)$$

[Expression 22]

$$v = g(x) = \sin^2 x \quad (22)$$

The soft sensor is designed based on the above described relationships, and is implemented in a multi-core processor or a many-core processor, whereby a position soft sensor device can be made, which estimates the moved distance x of the movable body that is the state variable, from the propulsive force u that is applied to the movable body, which is the input variable.

The partial derivative $\partial g(x)/\partial x$ by the state variable x of the inner function $g(x)$ shown in expression 22 is expressed by expression 23 as follows.

[Expression 23]

$$\frac{\partial g}{\partial x}(x(t)) = 2\sin x(t) \cos x(t) \quad (23)$$

When the soft sensor device of the first embodiment is configured as the position pressure soft sensor device, the function f(x, v, u) in expression 21 is implemented in the arithmetic operator 101 of the first core 100 illustrated in FIG. 6. Further, the function $\partial g(x)/\partial x*f(x, v, u)$ that is expressed by the product of the partial derivative $\partial g(x)/\partial x$ in expression 23 and the function f(x, v, u) in expression 21 can be implemented in the arithmetic operator 111 in the second core 110.

When the soft sensor device in the second embodiment is configured as the position pressure soft sensor device, the function f(x, v, u) in expression 21 can be implemented in the arithmetic operator 201 of the first core 200 illustrated in FIG. 9. Further, the partial derivative $\partial g(x)/\partial x$ in expression 23 can be implemented in the arithmetic operator 211 of the second core 210.

5. Others

The present application is not limited to the aforementioned embodiments, but can be carried out by being variously modified in the range without departing from the gist of the present application. For example, in the respective embodiments, arithmetic operations that are performed by the first arithmetic operation device may be distributed to a plurality of cores. When the first embodiment is cited as an example, the arithmetic operator 101 and the integrator 102 may be implemented in separate cores.

What is claimed is:

1. A soft sensor device that acquires a state variable x by calculation using a plurality of processor cores, in which a value of the state variable x changes in relation to an input variable u that is observable, and a time derivative dx/dt of the state variable x is expressed by a function f(x, g(x), u) having the state variable x, an inner function g(x) having the state variable x as an independent variable, and the input variable u, as independent variables, the soft sensor device, comprising:

a first arithmetic operation device that is an arithmetic operation device configured to perform an arithmetic operation by using one or a plurality of processor cores, and is programmed to calculate a function f(x, v, u) by using respective values of the state variable x, an intervening variable v that is defined by the inner function g(x), and the input variable u, and further obtain a value of the state variable x by time-integrating a value of the function f(x, v, u); and a second arithmetic operation device that is an arithmetic operation device configured to perform an arithmetic operation by using one or a plurality of processor cores that is or are different from the processor core or the processor cores used in the first arithmetic operation device, and is programmed to calculate the intervening variable v, wherein the first arithmetic operation device is programmed to calculate the function f(x, v, u) by using a value of the state variable x that is calculated in the first arithmetic operation device in processing of a previous time, a value of the intervening variable v that is calculated in the second arithmetic device in the processing of the previous time, and a value of the input variable u that is inputted in processing of this time.

2. The soft sensor device according to claim 1,
wherein the second arithmetic operation device is programmed to
calculate a product of a partial derivative $\partial g(x)/\partial x$ of the inner function g(x) with respect to the state variable x and the function f(x, v, u), by using the value of the state variable x that is calculated in the first arithmetic operation device in the processing of the previous time, the value of the intervening variable v that is calculated in the second arithmetic operation device in the processing of the previous time, and the value of the input variable u that is inputted in the processing of this time, and obtain a value of the intervening variable v by time-integrating a value of the product.

3. The soft sensor device according to claim 1,
wherein the second arithmetic operation device is programmed to
calculate a partial derivative $\partial g(x)/\partial x$ with respect to the state variable x of the inner function g(x) by using the value of the state variable x that is calculated in the first arithmetic operation device in the processing of the previous time, and
obtain a value of the intervening variable v by time-integrating a value that is obtained by multiplying a value of the partial derivative $\partial g(x)/\partial x$, and a value of the function f(x, v, u) that is calculated in the first arithmetic operation device in the processing of this time.

4. The soft sensor device according to claim 1,
wherein when the inner function g(x) is a composite function that is expressed by expression A as follows, and has a sequential structure comprising n of functions $g_n, \ldots, g_2$ and $g_1$, and an intervening variable $v_i$ is defined by expressions B, C and D as follows with respect to the respective functions $g_n, \ldots, g_2$ and $g_1$,
the first arithmetic operation device is programmed to perform an arithmetic operation of a component in a first row in a right side of expression E as follows, time-integrate an obtained value and thereby obtain a value of the state variable x, and
the second arithmetic operation device is programmed to perform arithmetic operations of respective components from a second row through an n+1$^{th}$ row in the right side of the expression E by using different processor cores respectively, and obtain a value of an intervening variable $v_n$ that is used in calculation of a function f(x, $v_n$, u) in the first arithmetic operation device, by time-integrating a value of a component in the n+1$^{th}$ row in the right side.

[Expression A]

$$g(x) = g_n \circ \ldots \circ g_2 \circ g_1(x) \quad (A)$$

[Expression B]

$$v_1 = g_1(x) \quad (B)$$

[Expression C]

$$v_i = g_i(v_{i-1}) \quad (C)$$

[Expression D]

$$v = v_n \quad (D)$$

[Expression E]

$$\frac{d}{dt}\begin{bmatrix} x(t) \\ v_1(t) \\ v_2(t) \\ \vdots \\ v_n(t) \end{bmatrix} = \begin{bmatrix} f(x(t), v_n(t), u(t)) \\ \frac{\partial g_1}{\partial x}(x(t))\frac{dx}{dt}(t) \\ \frac{\partial g_2}{\partial v_1}(v_1(t))\frac{dv_1}{dt}(t) \\ \vdots \\ \frac{\partial g_n}{\partial v_{n-1}}(v_{n-1}(t))\frac{dv_{n-1}}{dt}(t) \end{bmatrix} \quad (E)$$

5. The soft sensor device according to claim 4,
wherein a processor core that performs an arithmetic operation of a component in an i+1$^{th}$ row in the right side of the expression E is programmed to
calculate a product of i of partial derivatives from a partial derivative $\partial g_1(x(t))/\partial x$ through a partial derivative $\partial g_i(v_{i-1}(t))/\partial v_{i-1}$, and the function f(x, v, u), by using the value of the state variable x that is calculated in the first arithmetic operation device in the processing of the previous time, respective values of i−1 of intervening variables from an intervening variable $v_1$ through an intervening variable $v_{i-1}$ that are calculated in other processor cores in the processing of the previous time, the value of the intervening variable $v_n$ that is calculated in the second arithmetic operation device in the processing of the previous time, and the value of the input variable u that is inputted in the processing of this time, and obtain a value of an intervening variable $v_i$ by time-integrating a value of the product.

6. The soft sensor device according to claim 4,
wherein a processor core that performs an arithmetic operation of a component in an i+1$^{th}$ row in the right side of the expression E is programmed to
calculate a value of a partial derivative $\partial g_i(v_{i-1}(t))/\partial v_{i-1}$ by using a value of an intervening variable $v_{i-1}$ that is calculated in another processor core that performs an arithmetic operation of a component in an i$^{th}$ row in the right side of the expression E in the processing of the previous time, and
obtain a value of the intervening variable $v_i$ by time-integrating a value that is obtained by multiplying the value of the partial derivative $\partial g_i(v_{i-1}(t))/\partial v_{i-1}$, and a value of the component in the i$^{th}$ row in the right side of the expression E that is calculated in the other processor core in the processing of this time.

7. An internal combustion engine, comprising:
an intake manifold;
a throttle; and
a soft sensor device configured to acquire a state variable x by calculation using a plurality of processor cores, in which a value of the state variable x changes in relation to an input variable u that is observable, and a time derivative dx/dt of the state variable x is expressed by a function f(x, g(x), u) having the state variable x, an inner function g(x) having the state variable x as an independent variable, and the input variable u, as independent variables, wherein the plurality of process cores each include memory and a CPU for executing programs stored in the memory, the soft sensor device, further comprising:
  a first arithmetic operation device that is an arithmetic operation device configured to perform an arithmetic operation by using one or a plurality of processor cores, and is programmed to calculate a function f(x, v, u) by using respective values of the state variable x, an intervening variable v that is defined by the inner function g(x), and the input variable u, and further obtain a value of the state variable x by time-integrating a value of the function f(x, v, u); and
  a second arithmetic operation device that is an arithmetic operation device configured to perform an arithmetic operation by using one or a plurality of processor cores that is or are different from the processor core or the processor cores used in the first arithmetic operation device, and is programmed to calculate the intervening variable v,
  wherein the first arithmetic operation device is programmed to calculate the function f(x, v, u) by using a value of the state variable x that is calculated in the first arithmetic operation device in processing of a previous time, a value of the intervening variable v that is calculated in the second arithmetic device in the processing of the previous time, and a value of the input variable u that is inputted in processing of this time,
  wherein the state variable x is an intake manifold pressure of the internal combustion engine, the input variable u is a throttle opening degree area of the throttle, and the function f(x, g(x), u) is a function based on a throttle formula that defines a physical law established among a mass flow rate of air that passes through the throttle, the throttle opening degree area and the intake manifold pressure.

8. A movable body, comprising:
an internal combustion engine for applying a propulsive force to the movable body, and
a soft sensor device that acquires a state variable x by calculation using a plurality of processor cores, in which a value of the state variable x changes in relation to an input variable u that is observable, and a time derivative dx/dt of the state variable x is expressed by a function f(x, g(x), u) having the state variable x, an inner function g(x) having the state variable x as an independent variable, and the input variable u, as independent variables, wherein the plurality of process cores each include memory and a CPU for executing programs stored in the memory, the soft sensor device, further comprising:
  a first arithmetic operation device that is an arithmetic operation device configured to perform an arithmetic operation by using one or a plurality of processor cores, and is programmed to calculate a function f(x, v, u) by using respective values of the state variable x, an intervening variable v that is defined by the inner function g(x), and the input variable u, and further obtain a value of the state variable x by time-integrating a value of the function f(x, v, u); and
  a second arithmetic operation device that is an arithmetic operation device configured to perform an arithmetic operation by using one or a plurality of processor cores that is or are different from the processor core or the processor cores used in the first arithmetic operation device, and is programmed to calculate the intervening variable v,
  wherein the first arithmetic operation device is programmed to calculate the function f(x, v, u) by using a value of the state variable x that is calculated in the first arithmetic operation device in processing of a previous time, a value of the intervening variable v that is calculated in the second arithmetic device in the processing of the previous time, and a value of the input variable u that is inputted in processing of this time,
  wherein the state variable x is a moved distance of the movable body,
  the input variable u is the propulsive force that is applied to the movable body by the internal combustion engine, and
  the function f(x, g(x), u) is a function that expresses a relationship that is theoretically or empirically obtained between the moved distance and the propulsive force.

* * * * *